(12) United States Patent
Schwartz et al.

(10) Patent No.: US 7,240,124 B2
(45) Date of Patent: Jul. 3, 2007

(54) SYSTEM AND METHOD FOR TRANSFERRING DATA ON A NETWORK USING A SINGLE ROUTE OPTIMIZER TO DEFINE AN EXPLICIT ROUTE AND TRANSFER THE INFORMATION RELATED TO THE EXPLICIT ROUTE TO A PLURALITY OF ROUTERS AND A PLURALITY OF OPTIMIZED ROUTERS ON THE NETWORK

(75) Inventors: Steven J. Schwartz, Sudbury, MA (US); Kathleen Huber, Arlington, MA (US)

(73) Assignee: Silver Beech Networks, Inc., Arlington, MA (US)

( * ) Notice: Subject to any disclaimer, the term of this patent is extended or adjusted under 35 U.S.C. 154(b) by 596 days.

(21) Appl. No.: 10/175,251

(22) Filed: Jun. 19, 2002

(65) Prior Publication Data

US 2003/0018811 A1    Jan. 23, 2003

(51) Int. Cl.
*G06F 15/173* (2006.01)
(52) U.S. Cl. ................ 709/238; 709/224; 709/239; 709/242; 709/244
(58) Field of Classification Search ............. 709/226, 709/235, 238, 239, 224, 242, 244; 370/235, 370/252, 392, 400
See application file for complete search history.

(56) References Cited

U.S. PATENT DOCUMENTS

| | | | |
|---|---|---|---|
| 6,611,874 B1 * | 8/2003 | Denecheau et al. ......... 709/239 |
| 6,943,925 B1 * | 9/2005 | Islam .......................... 359/108 |
| 2002/0156914 A1 * | 10/2002 | Lo et al. ...................... 709/238 |
| 2002/0194362 A1 * | 12/2002 | Rawlins et al. ............. 709/235 |
| 2003/0009560 A1 * | 1/2003 | Venkitaraman et al. ..... 709/226 |
| 2003/0035374 A1 * | 2/2003 | Carter et al. ................ 370/235 |
| 2003/0043755 A1 * | 3/2003 | Mitchell ...................... 370/252 |
| 2003/0214954 A1 * | 11/2003 | Oldak et al. ................ 370/400 |
| 2005/0083936 A1 * | 4/2005 | Ma ............................. 370/392 |

OTHER PUBLICATIONS

Morris, Robert, et al., "Variance of Aggregated Web Traffic," Proceedings of the IEEE INFOCOM Conference, 2000.
Cao, Jin, et al., "Internet Traffic Tends To Poisson and Independent as the Load Increases," Bell Labs.

* cited by examiner

*Primary Examiner*—Rupal Dharia
*Assistant Examiner*—Quang N. Nguyen
(74) *Attorney, Agent, or Firm*—Mills & Onello, LLP

(57) ABSTRACT

An apparatus and method for forwarding data on a digital data network are provided. The network includes optimized routers and a plurality of routers connected on the network. A route optimizer receives information from the optimized routers and plurality of routers with regard to traffic congestion. The information can include queue lengths of one or more queues within the optimized routers. The route optimizer uses the congestion information from the optimized routers and plurality of routers to define optimum paths for transfer of data. The defined paths can be MPLS paths, which are then transmitted to the optimized routers and any other routers in the network.

22 Claims, 7 Drawing Sheets

SYSTEM AND METHOD FOR TRANSFERRING DATA ON A NETWORK USING A SINGLE ROUTE OPTIMIZER TO DEFINE AN EXPLICIT ROUTE AND TRANSFER THE INFORMATION RELATED TO THE EXPLICIT ROUTE TO A PLURALITY OF ROUTERS AND A PLURALITY OF OPTIMIZED ROUTERS ON THE NETWORK

BACKGROUND OF THE INVENTION

The deployment of optical transmission and switching equipment in data networks has significantly increased data rates over earlier electrical technologies. Optical technology promises to provide an increasing data transmission and switching capability that will quickly exceed that of even the most ambitious electronic designs. Optical transmission and rates of 40 Gb/s, 100 Gb/s, and 160 Gb/s, will soon be implemented in the network core. Switching, however, is a non-deterministic process, subject to congestion, and therefore always requires adjacent queuing. No practical optical queuing mechanism is presently available, and it is clear that such capability, in a practical form, will not be available for many years. As a consequence, fast optical components will require equally fast and large electronic queuing, which will be impractical or impossible to design.

Over the last five years, approximately 85% of hardware-based router projects failed to deliver working equipment at data rates of 2.5 Gb/s and 10 Gb/s. The most significant difficulty faced in these designs was, and remains, complexity. Hardware based IP routers are simply too complex to allow one to be confident of a timely development cycle. Moreover, it is becoming increasingly clear that the network core, where data rates are highest, does not benefit from much in the complex feature set of IP routing; a simpler protocol such as multiprotocol label switching (MPLS) is entirely adequate. Along with greater simplicity, MPLS offers the ability to readily engineer traffic flows so as to avoid congestion and thereby improve network throughput. Indeed, MPLS based traffic engineering is currently deployed in many networks for this reason.

SUMMARY OF THE INVENTION

In accordance with the invention, it is observed, in this context, that a lower level of network congestion necessitates smaller queues. Less congestion leads to more deterministic operation, and therefore reduced queue lengths. It appears that reduction of network congestion can reduce queue lengths by a factor of at least 1000. Such a reduction in queue length makes practical electronic queuing where it would otherwise be impractical. The most complex and difficult subsystems of a router are queuing, traffic management, and forwarding. It is also observed that traffic engineering is capable, by explicitly scheduling data flows, of eliminating the need for hardware traffic management. And, use of the relatively simple MPLS protocol greatly simplifies the task of electronic forwarding.

The proper application of traffic engineering, therefore, makes feasible electronics that would otherwise be infeasible, and introduces the possibility of designing a reduced complexity router that is physically smaller, dissipates less power, and has an increased likelihood of timely completion as compared with a conventional IP router. The present invention is directed to the application of traffic engineering to make feasible and practical the design of electronic subsystems as well as for the purpose of improving network throughput. And, it is the application of traffic engineering for the purpose of reducing the complexity of a router such that it is smaller, requires less power, and is more likely to be successfully brought to market.

A specific and important benefit of a reduced complexity router, as described above, is the ability to use commodity electronic components at higher data rates than would otherwise be possible. This reduces the development cycle by allowing older, readily available, components to be used where ASIC development would otherwise be required.

In accordance with the invention, a specific understanding of the nature of data traffic found in high-capacity channels is realized. Traffic engineering operates on a timescale approximately 12 orders of magnitude greater than hardware queuing. In accordance with the invention, it is recognized that actions taken by traffic engineering will be predictable and enduring at the timescale of electronic queuing. It is understood by mathematical analysis and empirical evidence that aggregated data traffic, as found in high bandwidth channels, is smooth and predictable. It is this specific predictability and smoothness that makes manipulations at the timescale of traffic engineering relevant to queue behavior at hardware timescales. Moreover, this understanding of the nature of aggregated data traffic is contrary to a vast body of current literature on the subject that predicts an absence of smoothing. The opportunity to develop reduced complexity hardware by use of traffic engineering is thus unavailable to the majority of developers.

In accordance with a first aspect of the invention, the invention is directed to a digital data network and method for transferring data on the network. The network includes a plurality of routers, at least one probe node connected to at least one of the routers and an optimized router in accordance with the invention connected on the network. A route optimizer connected to the plurality of routers and the optimized router receives information related to network congestion from the optimized router at the at least one probe node, defines a route on the network for forwarding the data, and transfers information related to the defined route to the plurality of routers and the optimized router.

The optimized router can include a queue for queuing the data. In one embodiment, the information related to congestion received from the optimized router is queue length of the queue in the optimized router. The queue can queue the data for no more than 1 millisecond. Thus, in accordance with the invention, even at extremely high data rates, because it is recognized that aggregated traffic smooths at high speed, relatively small queues are required. In one embodiment, the data rate of the network is approximately 40 Gigabits/second or higher. In another embodiment, the data rate is 160 Gb/sec or higher.

In one embodiment, the route defined by the route optimizer is a MPLS path. Alternatively, the route defined by the route optimizer is an explicit route, that is, a routing table. The network of the invention can include at least a portion of the Internet. Alternatively, the network can not include a portion of the Internet.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not nec

DETAILED DESCRIPTION OF PREFERRED EMBODIMENTS OF THE INVENTION

Figure 1:
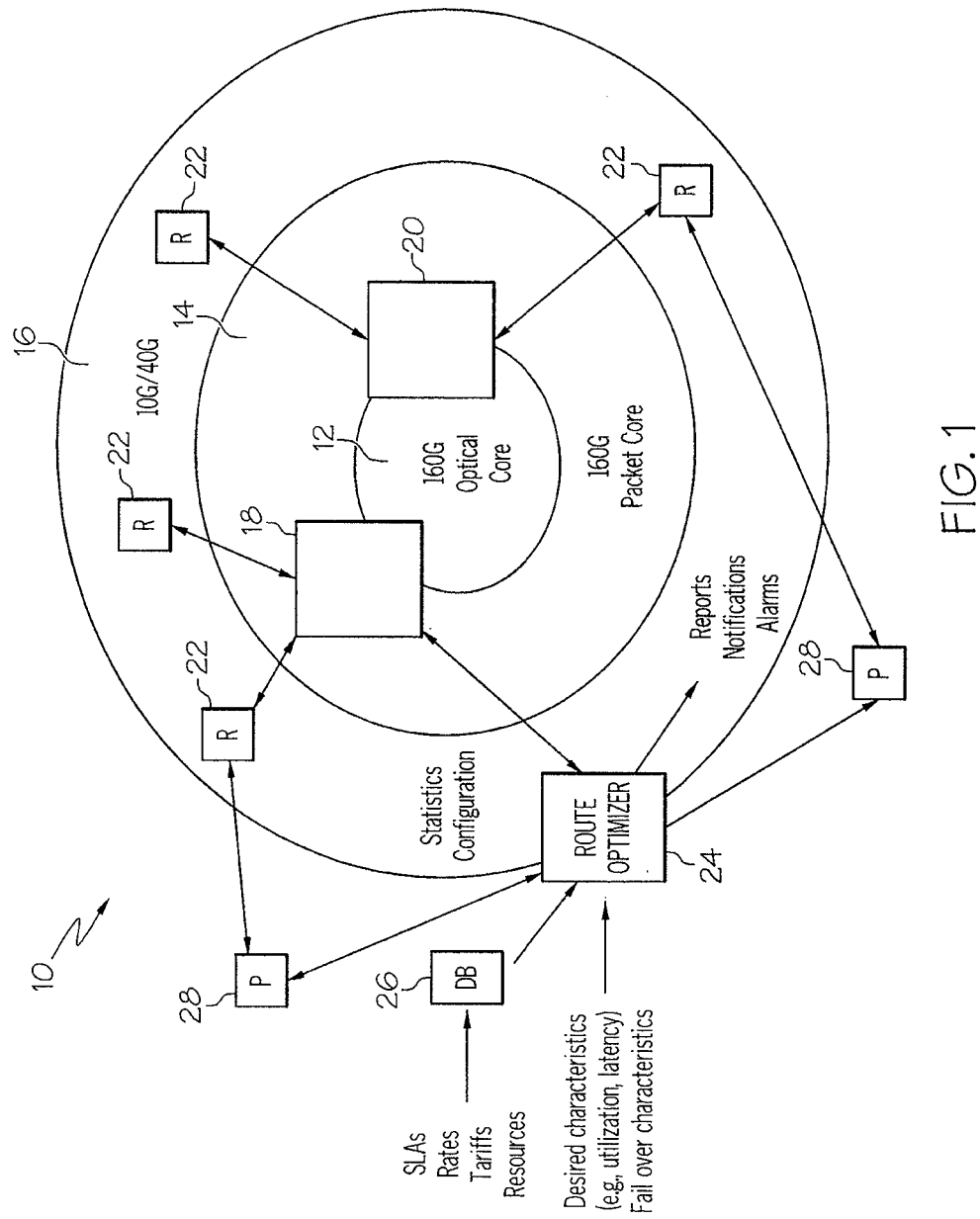
- FIG. 1 is a schematic block diagram of a digital data network implemented in accordance with one embodiment of the invention.

FIG. 1 is a schematic block diagram of a digital data network 10 implemented in accordance with one embodiment of the invention. The network 10 includes an optical core 12 which can operate at 160 Gb/sec and a packet core 14 which can also operate at 160 Gb/sec. The network 10 also includes a third layer 16 which can operate at 10 Gb/sec, 40 Gb/sec or other speeds. In accordance with the invention, a pair of optimized routers or switches 18 and 20 are connected across the optical core 12. The switches 18, 20 interface with a plurality of routers 22 connected on the network 10. The switches 18, 20 are routers optimized in accordance with the invention such that they have relatively small queue size and reduced hardware complexity.

At least one of the plurality of routers 22 interfaces with a probe node 28, which interfaces with a route optimizer 24 in accordance with the invention. The probe node is described below in detail. At least one of the switches 18 interfaces with a route optimizer or network optimizer 24 in accordance with the invention. The route optimizer 24 receives various inputs from various sources and uses the inputs to define an optimum path through the network 10 for the transfer of data. The defined path is then provided to at least one of the switches 18 and to the relevant routers 22 to set up the transfer path.

The route optimizer 24 receives information from a network database 26. This information can include service level agreements, rates, tariffs, network resources, etc. The route optimizer 24 can also receive inputs from a user managing the network, including desired network characteristics such as network utilization, latency, fail-over characteristics, etc. In addition to defining the path and reporting the defined path to the routers 22 and switch 18, the route optimizer 24 can also make reports, notifications and alarms regarding the network to a user operating the route optimizer 24. The path defined and provided by the route optimizer 24 can be an MPLS path.

As noted above, the route optimizer 24 of the invention receives various items of information from various sources. It receives definitions and identifications of network resources, including identification of nodes and links in the network. It also receives information regarding status of those resources, status of the network traffic matrix and the physical topology of the network. The route optimizer 24 is also given prescribed network characteristics and acceptable limits for various characteristics, that may include but are not limited to, latency, fail-over, capacity, jitter (delay variance), loss rate, and service level agreements (SLA). The route optimizer 24 also receives information from the optimized routers 18, 20 regarding their present queue lengths. This information is used by the route optimizer 24 to make conclusions regarding network congestion and, based on those conclusions, define optimum routes for traffic. Accordingly, the route optimizer outputs include the optimum label-switched paths (LSPs) for the traffic. This information can be provided to a user or operator or can be distributed throughout the network via the optimized routers 18, 20 using MPLS protocols such as, for example, RSVP or LDP. The route optimizer 24 can also make reports, notifications and alarms with regard to other network characteristics. For example, the route optimizer 24 can make reports on policing parameters such as passing and dropping packets, capacity availability and other network statistics such as average latency between two points or utilization between two points.

Figure 2:
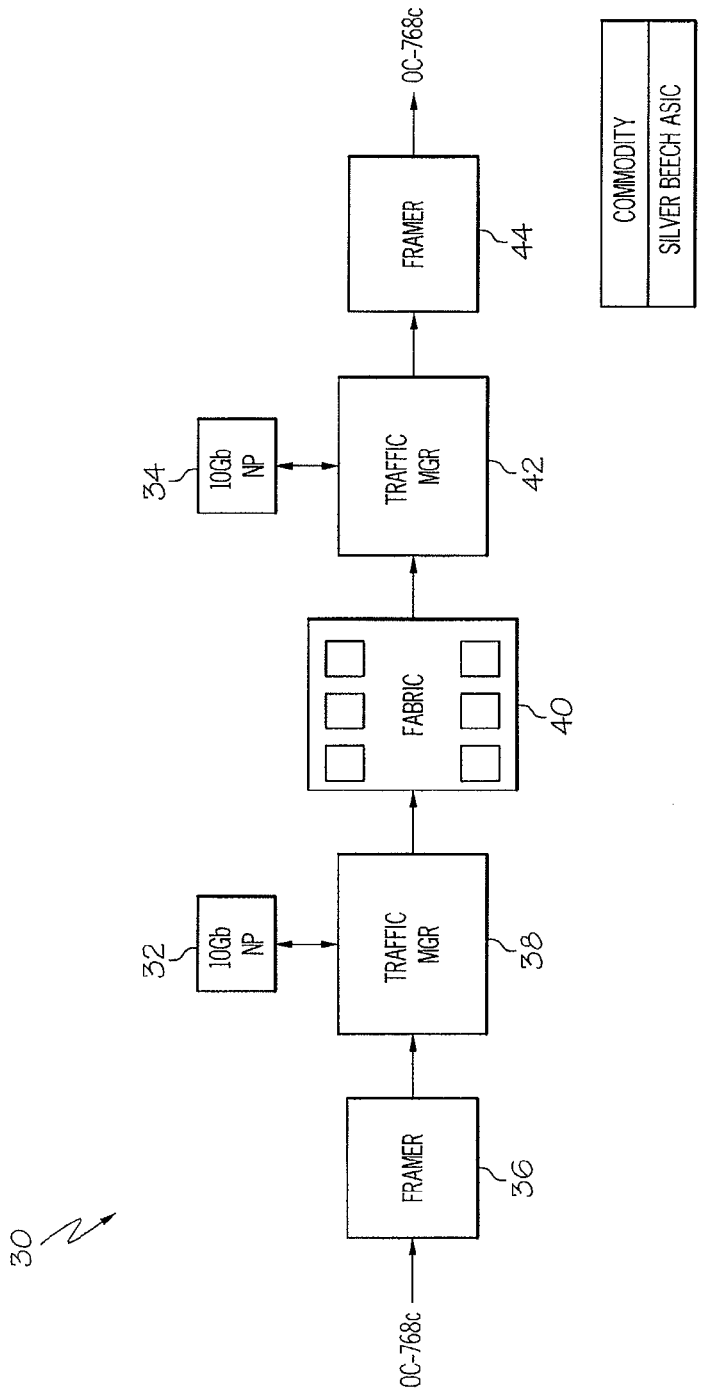
FIG. 2 is a schematic block diagram of a line card in an optimized router in accordance with the invention.

FIG. 2 is a schematic block diagram of a line card 30 in the optimized router 18, 20 of the invention. A line card provides the network interface for the optimized routers 18, 20. The line card 30 receives data, such as OC-768 data, at a framer 36, which formats the data for internal processing. The data is then forwarded to an inbound traffic manager 38 which routes the traffic for forwarding across the switching fabric 40. An outbound traffic manager 42 receives the data from the switching fabric 40 and forwards it to an outbound framer 44 which reformats the data for transmission on the network. The traffic managers 38 and 42 interface with network processors 32 and 34.

Figure 3:
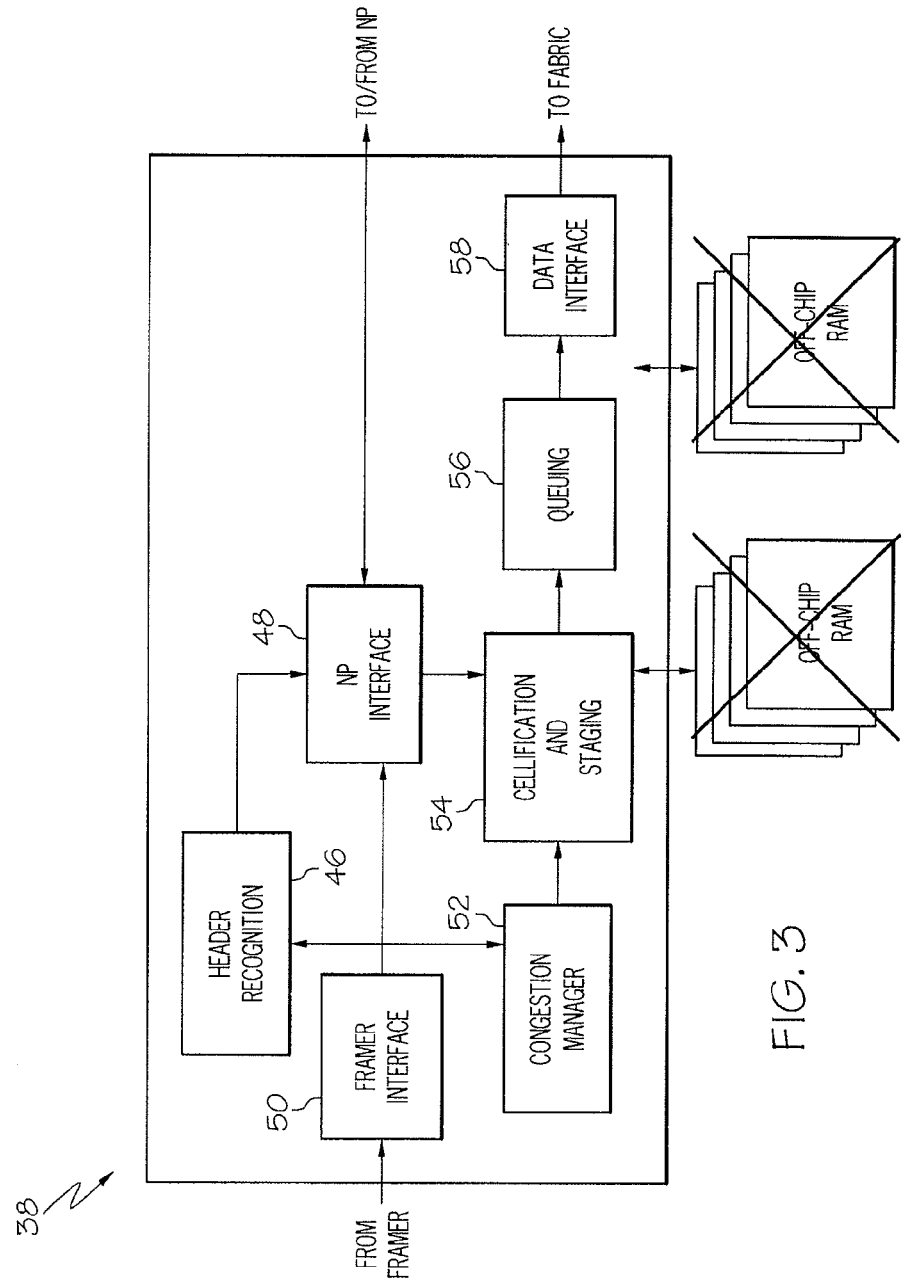
FIG. 3 is a schematic block diagram of an inbound traffic manager in accordance with the invention.

FIG. 3 is a schematic block diagram of the inbound traffic manager 38 shown in FIG. 2. The traffic manager includes a framer interface 50 which receives data from the framer 36. The data is analyzed and its header recognized by a header recognition module 46 which interfaces with the network processor 32 via a network processor interface 48. The congestion manager 52 makes decisions regarding discard and passing and dropping of data packets based on congestion. The data is formatted in cells at the cellification and staging module 54. In the cellification and staging module 54, the data traffic can be formatted into fixed-length data packets. Data is queued in the queuing module 56 and is forwarded to the switching fabric over data interface 58. In accordance with the invention, only minimal queuing 56 is required. In accordance with conventional art, large amounts of off-chip RAM would be required for queuing. However, in accordance with the invention, far less queuing is required.

The header recognition module 46 in accordance with the invention splits the header off of incoming data and processes the headers at, in one embodiment, one quarter of the incoming data rate. This is possible in accordance with the invention because in the MPLS packets, smaller headers are required. Accordingly, components at one-quarter the required speed can be used. These components are easier and less expensive to build then high-speed components.

Figure 4:
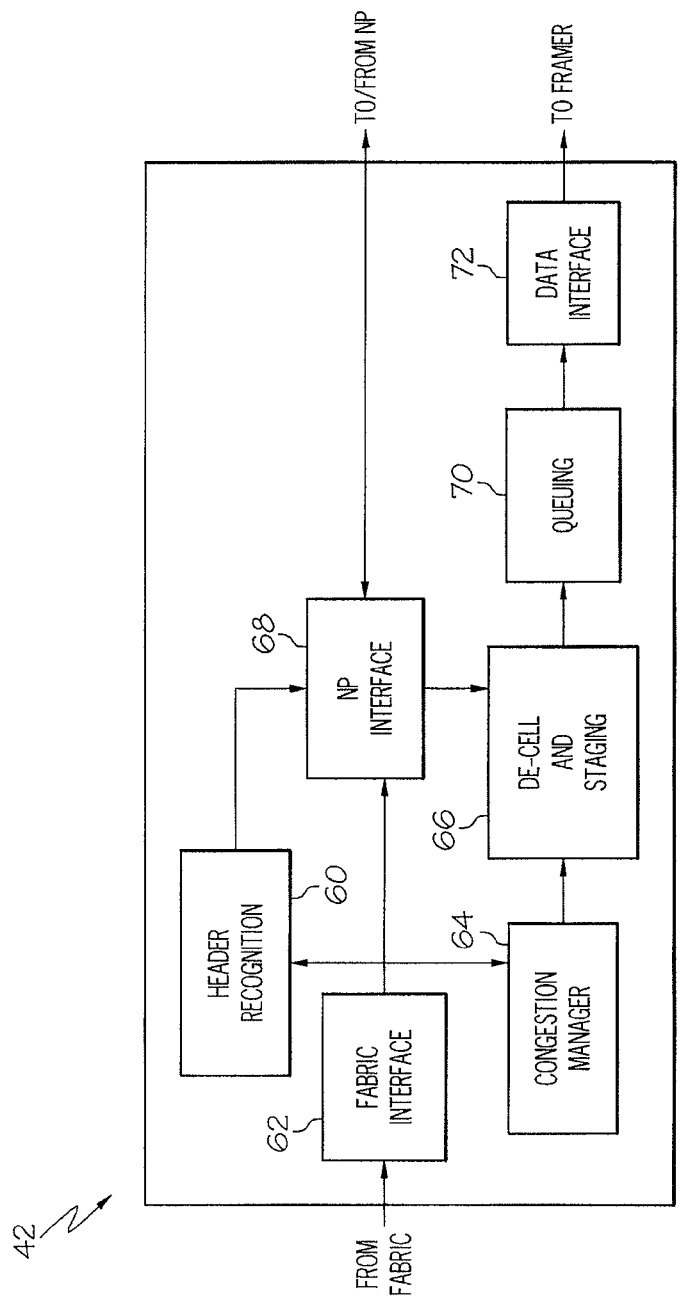
FIG. 4 is a schematic block diagram of an outbound traffic manager in accordance with the invention.

FIG. 4 is a schematic block diagram of the outbound traffic manager 42 shown in FIG. 2. The data traffic is received at a fabric interface 62. Header recognition is performed in the header recognition module 60, which interfaces with the network processor 34 via a network processor interface 68. The congestion manager 64 performs a similar function to the congestion manager 52 of the inbound traffic manager 38. The data is routed through decalcification and staging module 66. The data is queued in the queuing module 70 and is routed to the outbound framer 44 via a data interface 72.

In a typical network, average IP link utilization is only 15%, while a few bottleneck links see greater than 80% utilization. In accordance with the invention, a reliable and low latency network is operated at much higher average utilization. The principal reason for low utilization is the fact that IP routing decision are made on a distributed basis and are not inherently aware of congestion. Routes are chosen on the basis of shortest path without regard for overall network behavior.

In accordance with the invention, a centralized optimization process is implemented, which views and considers the entirety of a network or multiple networks. The result is a superior optimization, in throughput, latency, and quality of service (QoS) behaviors.

Figure 5:
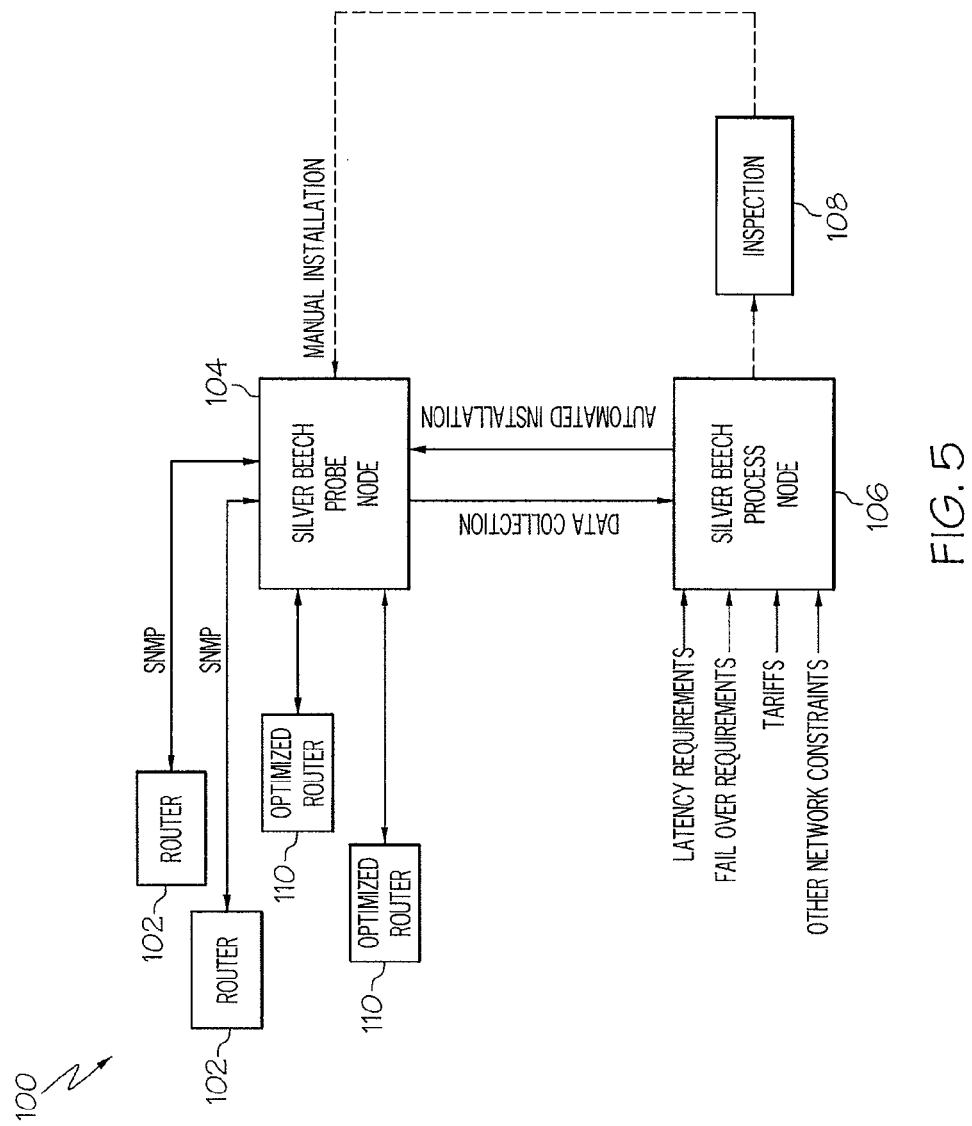
FIG. 5 is a schematic block diagram of an embodiment of a network in accordance with the invention.

FIG. 5 is a schematic block diagram of an embodiment of a network 100 in accordance with the invention. In one embodiment, network statistics are collected from routers 102 by a probe node 104. The statistics are then sent to and processed by a process node 106, which computes optimal configuration parameters. Network statistics including queue lengths are collected from optimized routers 110 by process node 106. The process nodes 106 compute an optimal configuration which is installed back to the routers 102 via the probe node 104.

In accordance with the invention, the probe node 104 can be either physical or virtual depending on how much data must be collected. In one embodiment, the probe node 104 is a small NEBS-compliant hardware platform co-located with routers 102. The probe node 104 communicates with routers 102 using Simple Network Management Protocol (SNMP). When data collection demands are small, a virtual probe node 104 may be used, carrying its communications in-band. The last step of installation of configuration can be done automatically or manually. Manual configuration permits user inspection/simulation 108 of a configuration prior to installation. Automated installation gives real-time optimization.

In one embodiment, the process node 106 is a small NEBS-compliant platform running Linux. Multiple process nodes 106 are typically deployed in a network, with each doing the same computation and comparing its local results with results of the other process nodes 106. Under normal circumstances all results will be identical and one process node 106 is voted master. The network uses the master node's computation. In the event one process node 106 fails, the others recognize the absent or incorrect result and, if necessary, vote a new master.

Figure 6:
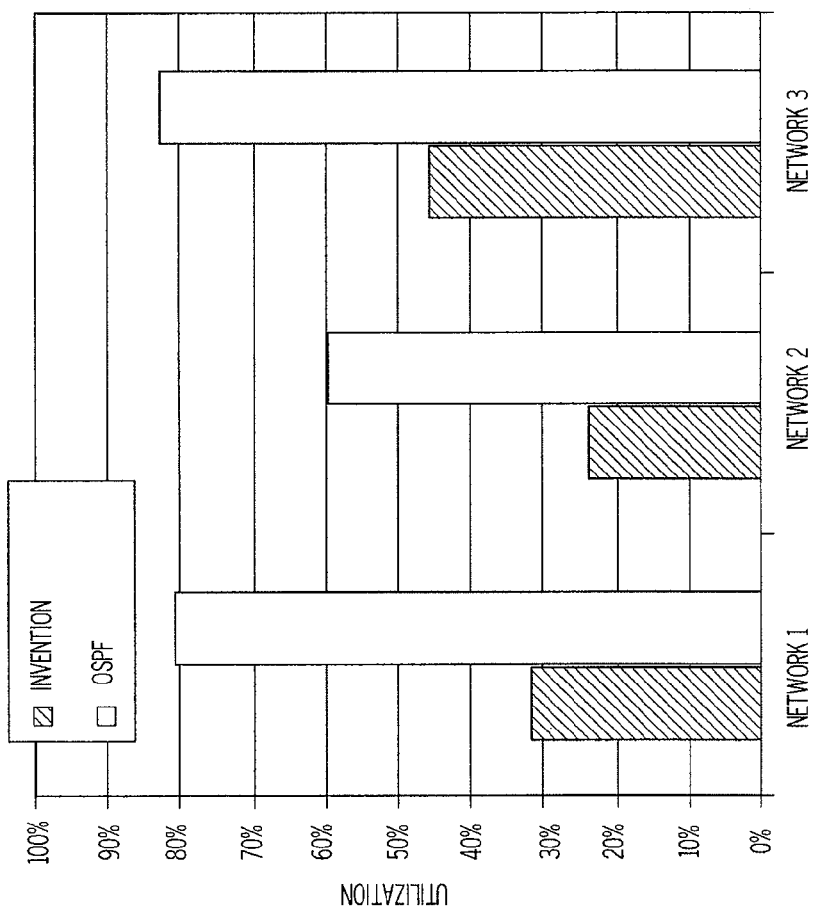
FIG. 6 is a graph illustrating the throughput improvement achieved by the invention for three networks.

Generally, the network performance limit is reached when a few links reach 75% utilization creating bottlenecks, while the majority of links remain underutilized. The optimization tool of the invention computes the optimal distribution of traffic, consistent with network design goals, so as to equalize link loading, thereby making fuller use of otherwise underutilized links. FIG. 6 is a graph illustrating the throughput improvement achieved by the invention over the Open Shortest Path First (OSPF) protocol for three networks.

A further consequence of the optimization of the invention is reduced latency. Reductions in latency come from elimination of bottleneck links and reduced queuing delay.

Figure 7:
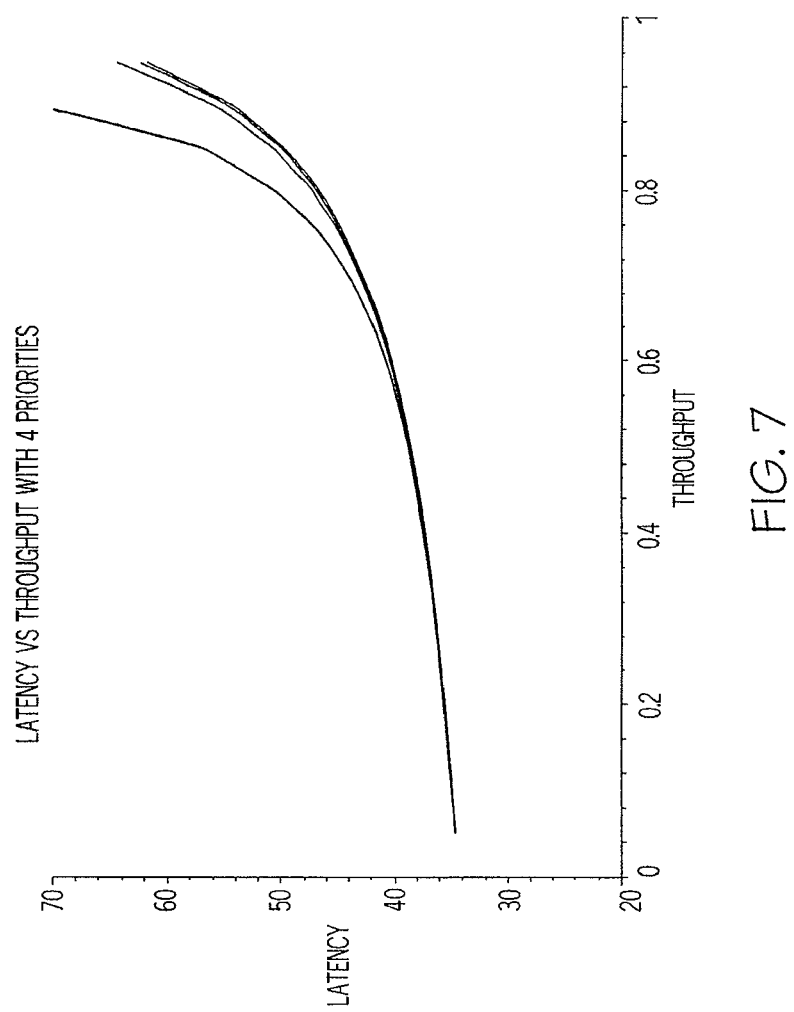
FIG. 7 is a graph illustrating latency versus throughput for four quality of service priorities.

Conventional QoS implementations based on priority are not particularly effective. For example, latency for four priority levels through a non-blocking switch is illustrated in FIG. 7. Actual values of latency will vary by application, but the shape of the curves is common to non-blocking devices. Latency is influenced significantly by priority only at throughputs greater than about 75%, the knee of the queuing curve. Most IP links are appropriately operated below the knee, but priority is ineffective here in managing latency. Above the knee, at throughputs over 75%, priority is effective, but overall network behavior becomes unacceptable. Priority-based QoS does not achieve its objectives. The approach of the invention addresses QoS in a different manner. By optimizing routes according to a QoS design, latencies are managed effectively at all utilizations.

Precise management of service level agreements (SLA) involves tracking each network commitment along with its impact on aggregate network behavior. Each commitment changes the queuing behavior of the entire network and thereby casts a shadow on all other commitments The SLA management tool of the invention computes precisely the effect of each commitment, thereby allowing a greater proportion of network resources to be committed, and increased revenue realized.

The process of the invention is tuned for extremely fast operation. Bandwidth, latency, and topology optimizations can be run in real-time, offering optimal network behaviors and minimum network costs in a changing environment.

The optimization tool of the invention is capable of completely automated operation, offering the opportunity to realize lower network operations costs. Any step in the optimization process, however, can be handled manually if desired. For example, the process node configuration output can be inspected manually, or run through a network simulation tool prior to installation.

The topology design tool of the invention employs bandwidth and latency optimization processes to design optimal overlay topologies. An optimal topology uses the fewest links and nodes to achieve specified network design requirements. Use of the topology design tool can result in a network with fewer links and lower costs.

The capacity planner tool of the invention provides trend analysis, bottleneck prediction, resource projections, and off-line "what-if" analysis. The capacity planner tool differs from most other what-if network design tools in that it employs an explicit notion of global optimum. Configurations can be compared to a global optimum, given user constraints such as latency, fail over requirements, QoS design, tariffs, etc.

The optimization tool of the invention can design, in real-time, optimal overlay topologies in response to changing outsourced bandwidth availability and costs. This allows the lowest costs to be realized in a dynamic market environment, while always meeting network design requirements.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A digital data network for transferring data, comprising:
a plurality of routers connected on the network;
at least one probe node connected to at least one of the plurality of routers;
a plurality of optimized routers connected on the network; and
a single route optimizer connected to the plurality of routers and the plurality of optimized routers, the single route optimizer receiving information related to network congestion from the plurality of optimized routers and the at least one probe node, and, using traffic smoothing characteristics of high bandwidth channels and the information related to network congestion, (i) defining a route on the network for forwarding the data, and (ii) transferring information related to the defined route to the plurality of routers and the plurality of optimized routers, wherein:

the single route optimizer has global control over the network such that the single route optimizer completely defines the route independent of any computations of routes by the plurality of routers and the plurality of optimized routers, such that the defined route transferred by the single route optimizer to the plurality of routers and the plurality of optimized routers is an explicit route, therefore eliminating the need for hardware traffic management within the plurality of routers and the plurality of optimized routers to compute the explicit route, and the information related to network congestion from the plurality of optimized routers comprises queue length of queues in the plurality of optimized routers.

2. The digital data network of claim 1, wherein each at the plurality of optimized routers comprises a queue for queuing the data, the queue queuing the data for no more than 1 millisecond.

3. The digital data network of claim 1, wherein the network transfers data at 40 Gb/sec or higher.

4. The digital data network of claim 1, wherein the network transfers data at 160 Gb/sec or higher.

5. The digital data network of claim 1, wherein the digital data network comprises at least a portion of the Internet.

6. The digital data network of claim 1, wherein the digital data network comprises no portion of the Internet.

7. A method of transferring data on a digital data network, comprising:

connecting a plurality of routers on the network;

connecting at least one probe node to at least one of the plurality of routers;

connecting a plurality of optimized routers on the network; and connecting a single route optimizer to the plurality of routers and the plurality of optimized routers the single route optimizer receiving information related to network congestion from the plurality of optimized routers and the at least one probe node, and, using traffic smoothing characteristics of high bandwidth channels and the information related to network congestion, (i) defining a route on the network for forwarding the data, and (ii) transferring information related to the defined route to the plurality of routers and the plurality of optimized routers, wherein:

the single route optimizer has global control over the network such that the single route optimizer completely defines the route independent of any computations of routes by the plurality of routers and the plurality of optimized routers, such that the defined route transferred by the single route optimizer to the plurality of routers and the plurality of optimized routers is an explicit route, therefore eliminating the need for hardware traffic management within the plurality of routers and the plurality of optimized routers to compute the explicit route, and the information related to network congestion received from the plurality of optimized routers comprises queue length of queues in the plurality of optimized routers.

8. The method of claim 7, wherein each of the plurality of optimized routers comprises a queue for queuing the data, the queue queuing the data for no more than 1 millisecond.

9. The method of claim 7, wherein the network transfers data at 40 Gb/sec or higher.

10. The method of claim 7, wherein the network transfers data at 160 Gb/sec or higher.

11. The method of claim 7, wherein the digital data network comprises at least a portion of the Internet.

12. The method of claim 7, wherein the digital data network comprises no portion of the Internet.

13. A digital data network for transferring data, comprising:

a plurality of routers connected on the network;

a plurality of optimized routers connected on the network; and a single route optimizer connected to the plurality of routers and the plurality of optimized routers, the single route optimizer receiving the data to forward the data on the network, each of the optimized routers comprising a queue for queuing the data and using traffic smoothing characteristics of high bandwidth channels, the queues queuing the data for no more than 1 millisecond, wherein:

the single route optimizer receives information related to network congestion from the plurality of optimized routers, defines a route on the network for forwarding the data, and transfers information related to the defined route to the plurality of routers and the plurality of optimized routers, the single route optimizer has global control over the network such that the single route optimizer completely defines the route independent of any computations of routes by the plurality of routers and the plurality of optimized routers, such that the defined route transferred by route optimizer to the plurality of routers and the plurality of optimized routers is an explicit route, therefore eliminating the need for hardware traffic management within the plurality of routers and the plurality of optimized routers to compute the explicit route, and the information related to network congestion from the plurality of optimized routers comprises queue length of the queues in the plurality of optimized routers.

14. The digital data network of claim 13, wherein the network transfers data at 40 Gb/sec or higher.

15. The digital data network of claim 13, wherein the network transfers data at 160 Gb/sec or higher.

16. The digital data network of claim 13, wherein the digital data network comprises at least a portion of the Internet.

17. The digital data network of claim 13, wherein the digital data network comprises no portion of the Internet.

18. A method of transferring data on a digital data network, comprising:

connecting a plurality of routers on the network;

connecting a plurality of optimized routers on the network;

connecting a single route optimizer to the plurality of routers and the plurality of optimized routers, the single route optimizer receiving the data to forward the data on the network, each at the optimized routers comprising a queue for queuing the data, using traffic smoothing characteristics of high bandwidth channels, the queues queuing the data for no more than 1 millisecond, wherein:

the single route optimizer receives information related to network congestion from the plurality of optimized routers, defines a route on the network for forwarding the data, and transfers information related to the defined route to the plurality of routers and the plurality of optimized routers, the single route optimizer has global control over the network such that the single route optimizer completely defines the route independent of any computations of routes by the plurality of routers and the plurality of optimized routers, such that the defined route transferred by the single route optimizer to the plurality of routers and the plurality of optimized routers is an explicit route, therefore eliminating the need for hardware traffic management within the plurality of routers and the plurality of optimized routers to compute the explicit route, and the information related to network congestion received from the plurality of optimized routers comprises queue length of queues in the plurality of optimized routers.

19. The method of claim 18, wherein the network transfers data at 40 Gb/sec or higher.

20. The method of claim 18, wherein the network transfers data at 160 Gb/sec or higher.

21. The method of claim 18, wherein the digital data network comprises at least a portion of the Internet.

22. The method of claim 18, wherein the digital data network comprises no portion of the Internet.

* * * * *